United States Patent [19]
Kolmanovsky et al.

[11] Patent Number: 6,128,902
[45] Date of Patent: Oct. 10, 2000

[54] CONTROL METHOD AND APPARATUS FOR TURBOCHARGED DIESEL ENGINES HAVING EXHAUST GAS RECIRCULATION

[75] Inventors: Ilya V. Kolmanovsky, Ypsilanti; Michiel J. Van Nieuwstadt, Ann Arbor, both of Mich.; Paul Eduard Moraal, Wuerselen, Germany

[73] Assignee: Ford Global Technologies, Inc., Dearborn, Mich.

[21] Appl. No.: 09/237,742

[22] Filed: Jan. 26, 1999

[51] Int. Cl.$^7$ ............................ F02B 37/24; F02M 25/07
[52] U.S. Cl. ............................................ 60/605.2; 60/602
[58] Field of Search ............................ 60/600, 601, 602, 60/603, 605.2

[56] References Cited

U.S. PATENT DOCUMENTS

| | | |
|---|---|---|
| 4,474,008 | 10/1984 | Sakurai et al. ........................ 60/605.2 |
| 5,123,246 | 6/1992 | Younessi . |
| 5,228,292 | 7/1993 | Hanauer . |
| 5,273,019 | 12/1993 | Matthews . |
| 5,505,174 | 4/1996 | Komoriya . |
| 5,520,161 | 5/1996 | Klopp . |
| 5,794,445 | 8/1998 | Dungner ............................... 60/605.2 |
| 6,029,451 | 2/2000 | Gartner ................................ 60/605.2 |
| 6,035,639 | 3/2000 | Kolmanovsky et al. ............. 60/605.2 |

FOREIGN PATENT DOCUMENTS 0 774 574 A1  5/1997  European Pat. Off. .

*Primary Examiner*—Michael Koczo
*Attorney, Agent, or Firm*—Jerome R. Drouillard

[57] ABSTRACT

A method and apparatus of controlling the airflow into a compression ignition engine having an exhaust gas recirculation (EGR) system and a variable geometry turbocharger (VGT). The control strategy includes the steps of measuring the intake manifold pressure and exhaust manifold pressure, and using these values, estimating the EGR flow fraction. The EGR flow fraction is then used in a proportional plus integral feedback control loop to generate position commands for the EGR valve. Similarly, the intake manifold pressure signal is used in a proportional plus integral feedback control loop to generate position commands for the VGT. In this way, the EGR valve is used to regulate the EGR flow fraction to a desired value and the VGT turbine is used to regulate the intake manifold pressure to a desired value.

9 Claims, 2 Drawing Sheets

CONTROL METHOD AND APPARATUS FOR TURBOCHARGED DIESEL ENGINES HAVING EXHAUST GAS RECIRCULATION

TECHNICAL FIELD

This invention relates to turbocharged compression ignition engines having exhaust gas recirculation systems and, more particularly, to methods of controlling the intake manifold pressure and fraction of exhaust gas recirculation in diesel engines equipped with variable geometry turbochargers (VGT) and exhaust gas recirculation (EGR) systems.

BACKGROUND OF THE INVENTION

High performance, high speed diesel engines are often equipped with turbochargers to increase power density over a wider engine operating range, and EGR systems to reduce the production of NOx emissions.

Turbochargers use a portion of the exhaust gas energy to increase the mass of the air charge delivered to the engine combustion chambers. The larger mass of air can be burned with a larger quantity of fuel, thereby resulting in increased power and torque as compared to naturally aspirated engines.

A typical turbocharger consists of a compressor and turbine coupled by a common shaft. The exhaust gas drives the turbine which drives the compressor which, in turn, compresses ambient air and directs it into the intake manifold. Variable geometry turbochargers (VGT) allow the intake airflow to be optimized over a range of engine speeds. This is accomplished by changing the angle of the inlet guide vanes on the turbine stator. An optimal position for the inlet guide vanes is determined from a combination of desired torque response, fuel economy, and emissions requirements.

EGR systems are used to reduce NOx emissions by increasing the dilution fraction in the intake manifold. EGR is typically accomplished with an EGR valve that connects the intake manifold and the exhaust manifold. In the cylinders, the recirculated exhaust gas acts as an inert gas, thus lowering the flame and in-cylinder gas temperature and, hence, decreasing the formation of NOx. On the other hand, the recirculated exhaust gas displaces fresh air and reduces the air-to-fuel ratio of the in-cylinder mixture.

In compression ignition engines equipped with both VGT and EGR systems, optimal steady-state performance in terms of fuel economy and emissions is achieved by coordinating the operation of the two actuators. Typical engine designs utilize a compressor mass airflow (MAF) sensor and a manifold absolute pressure (MAP) sensor for proper regulation of airflow into the engine and, consequently, EGR flow in VGT-equipped engines. Regulation of airflow is important because it directly relates to the amount of fuel that can be injected to meet driver demand. For a given engine speed and requested fueling rate, the control algorithm looks up the desired values for MAP and MAF and controls the EGR to achieve the desired MAF and the VGT to achieve the desired MAP.

The sensor set selection, thus, determines the control system cost and performance. For example, MAF sensors have limited accuracy and are more expensive than MAP sensors or exhaust manifold pressure (EXMP) sensors. The difficulty in calibrating the engine control strategy is also directly related to the sensors used to control the engine. Consequently, there is a need for an engine control system having a low-cost sensor set, which is easy to calibrate, and provides robust engine performance.

DISCLOSURE OF THE INVENTION

One object of the present invention is to provide an improved compression ignition engine control strategy having reduced sensor cost and simplified calibration requirements.

Another object is an engine strategy which regulates MAP and the EGR flow fraction using a MAP sensor and EXMP sensor to control the EGR and VGT.

The present control scheme is advantageous because it allows the traditional MAF sensor to be replaced by a lower cost EXMP sensor. In addition, by selecting MAP and EGR flow fraction as the regulated outputs, the control scheme provides improved system performance and reduced sensitivity to errors in MAF estimation. In other words, sensor cost reduction is achieved without sacrificing performance, as may be expected when using estimated, rather than measured, values.

According to the present invention, the foregoing and other objects and advantages are obtained by a method of controlling the airflow into a compression ignition engine having an EGR and a VGT. The method includes the steps of determining desired values for the intake manifold pressure ($p_{1d}$) EGR flow fraction ($r_d$), and generating error signals ($e_{p1}$ and $e_r$) representing the system deviation between the measured intake manifold pressure ($p_1$) and $p_{1d}$ and the estimated EGR flow fraction and $r_d$. In addition, an open loop EGR valve control value ($V_{egr}$) and an open loop turbocharger value ($V_{vgt}$) are determined as a function of the engine speed and fueling rate. The method further includes the step of generating proportional and integral feedback gains for the EGR valve ($K_{p,egr}$, $K_{i,egr}$) and turbocharger turbine ($K_{p,vgt}$, $K_{i,vgt}$), and generating the EGR valve control signal ($U_{egr}$) as a function of $V_{egr}$, $K_{p,egr}$, $K_{i,egr}$ and $e_r$; and generating the turbocharger signal ($U_{vgt}$) as a function of $V_{vgt}$, $K_{p,vgt}$, $K_{i,vgt}$ and $e_{p1}$. These control signals, $U_{egr}$ and $U_{vgt}$, are then used to control the EGR valve to regulate r and control the turbocharger turbine to regulate $p_1$.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should be made to the embodiments illustrated in greater detail in the accompanying drawings and described below by way of examples of the invention. In the drawings.

DESCRIPTION OF THE PREFERRED EMBODIMENT

Figure 1:
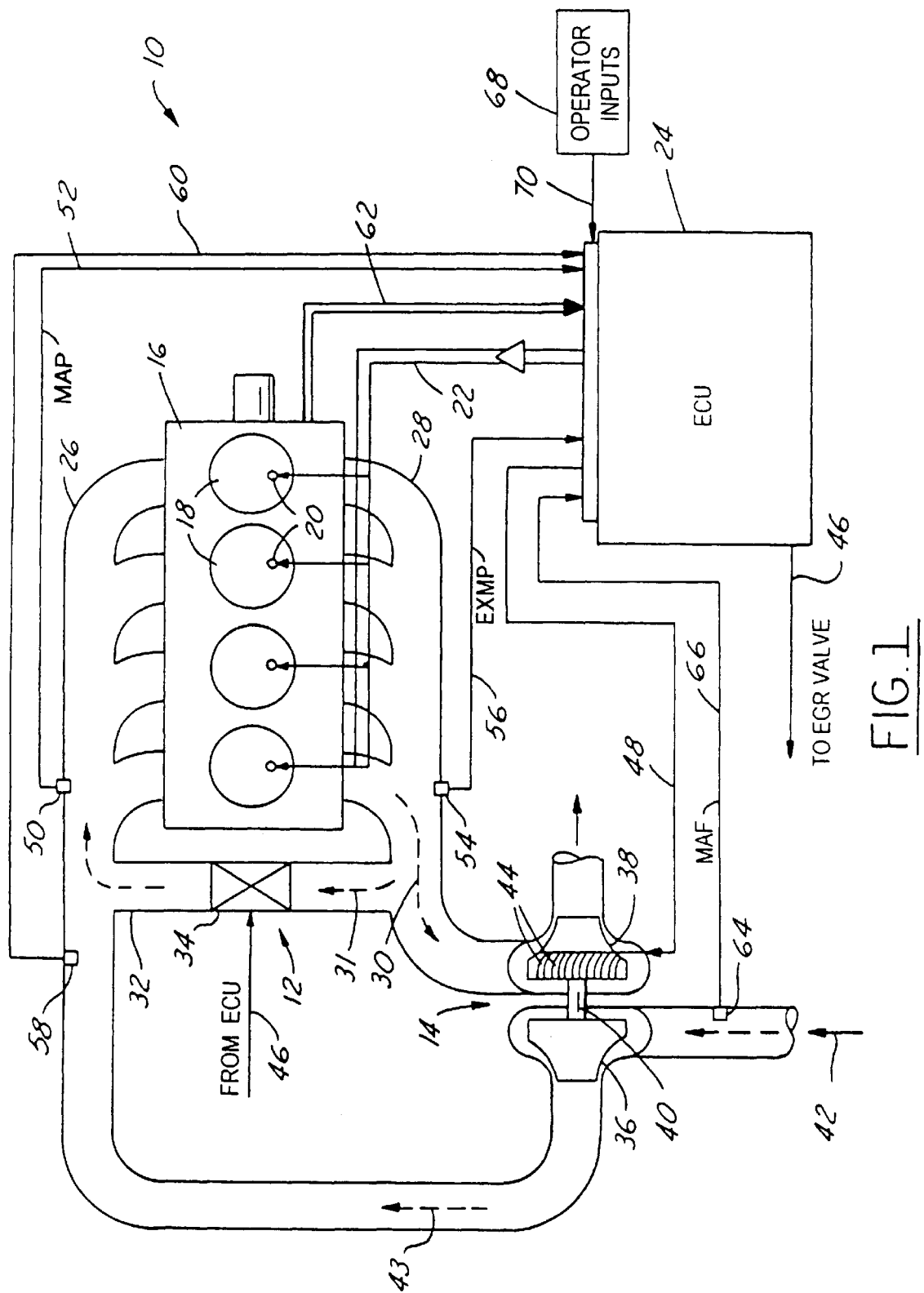
FIG. 1 is a schematic view of a compression ignition engine system having an EGR system and a VGT in accordance with one embodiment of the present invention.

Turning first to FIG. 1, there is shown a simplified schematic diagram of a compression ignition engine system 10 equipped with an exhaust gas recirculation (EGR) system 12 and a variable geometry turbocharger (VGT) 14. A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31. An EGR valve 34 regulates the amount of exhaust gas recirculated from the exhaust manifold 28. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

The turbocharger 14 uses exhaust gas energy to increase the mass of the air charge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 consists of a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26. The VGT 14 can be modified as a function of engine speed during engine operation by varying the turbine flow area and the angle at which the exhaust gas 30 is directed at the turbine blades. This is accomplished by changing the angle of the inlet guide vanes 44 on the turbine 38. The optimal position for the engine guide vanes 44 is determined from the desired engine operating characteristics at various engine speeds.

All of the engine systems, including the EGR 12, VGT 14 and fuel injectors 20 are controlled by the ECU. For example, signal 46 from the ECU 24 regulates the EGR valve position, and signal 48 regulates the position of the VGT guide vanes 44.

In the ECU 24, the command signals 46, 48 to the EGR 12 and VGT 14 actuators are calculated from measured or estimated variables and engine operating parameters by means of a control algorithm. Sensors and calibratable lookup tables residing in ECU memory provide the ECU 24 with engine operating information. For example, an intake manifold pressure (MAP) sensor 50 provides a signal 52 to the ECU indicative of the pressure in the intake manifold 26. Likewise, exhaust manifold pressure (EXMP) sensor 54 provides a signal 56 to the ECU 24 indicative of the pressure in the exhaust manifold 28. Further, an aircharge temperature sensor 58 provides a signal 60 to the ECU 24 indicative of the temperature of the intake air charge.

Additional sensory inputs are also be received by the ECU along signal line 62 such as engine coolant temperature, engine speed, and throttle position. Additional operator inputs 68 are received along signal 70 such as the accelerator pedal position.

Based on the sensory inputs and engine mapping data stored in memory, the ECU controls the EGR to regulate the EGR flow fraction (r), controls the VGT to regulate the intake manifold pressure (MAP). Because the system 10 does not include a MAF sensor, however, MAP and EXMP are used to generate the control signals.

The engine control methods described herein apply to all turbocharged engines equipped with EGR systems, regardless of the type of fuel used. Thus, it is to be understood that references to diesel engines are equally applicable to other engines as well. In addition, throughout the specification, the following notations are used in describing measured or calculated variables:

| | |
|---|---|
| p | pressure (kPa) |
| T | temperature (K) |
| m | mass (kg) |
| W | mass flow (kg/s) |
| F | burnt gas fraction |
| $\alpha_{egr}$ | EGR valve position |

Furthermore, the following subscripts are used to denote regions of the engine system:

| | |
|---|---|
| 1 | intake manifold 26 |
| 2 | exhaust manifold 28 |
| e | engine block 16 |
| t | turbine 38 |
| c | compressor 36 |

Finally, the following thermodynamic constants are referenced for air at 300K:

$$c_p = 1.0144 \text{ kJ/kg/K} \qquad R = c_p - c_v$$

$$c_v = 0.7274 \text{ kJ/kg/K} \qquad \gamma = c_p / c_v$$

Hence, the symbol $p_1$, for example, refers to the intake manifold pressure in kPa. Combined subscripts, such as "e2", refer to flows from the first to the second subsystem.

Figure 2:
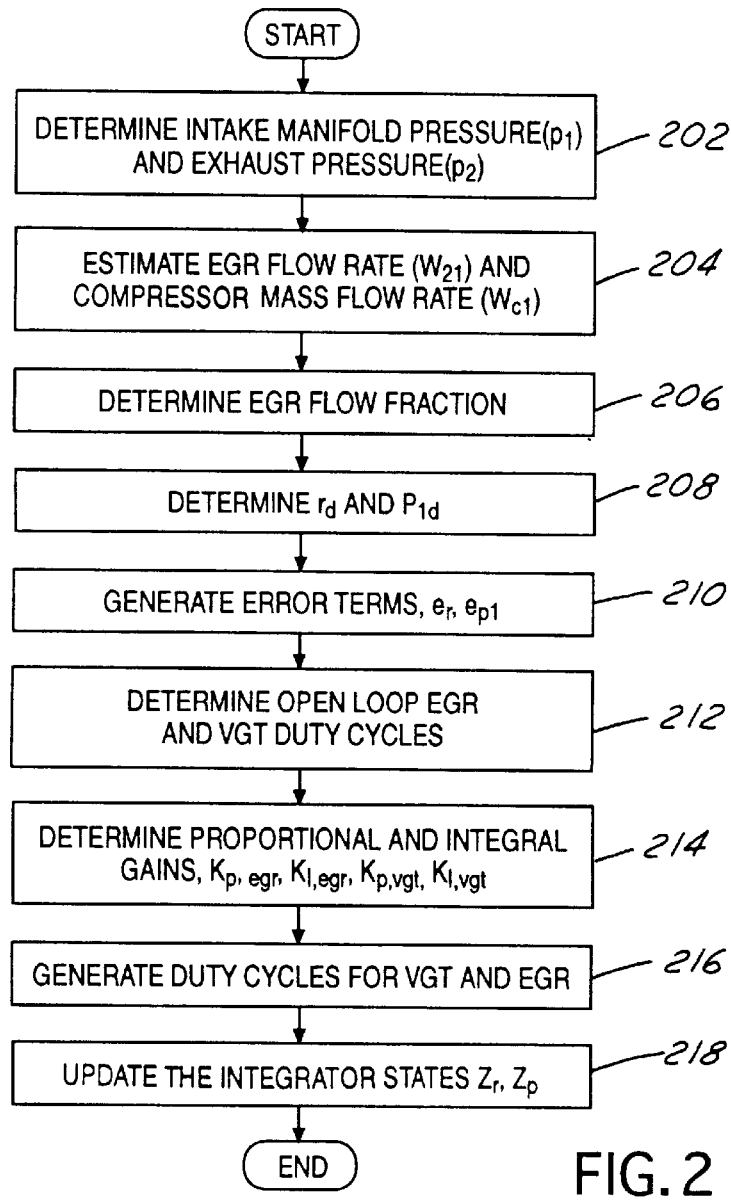
FIG. 2 is a logic diagram of an engine control method according to one embodiment of the present invention.

FIG. 2 is the logic flow diagram of the ECU control algorithm to generate the EGR and VGT duty cycles from the tracked variables of MAP and EGR flow fraction (r). This logic routine resides in the ECU memory and is executed as part of the foreground logic used to control the operating characteristics of the engine.

At step 202, measurements of intake manifold pressure ($p_1$) and exhaust manifold pressure ($p_2$) are received by the ECU 24 by way of signal inputs 52 and 56, respectively. These signals can be filtered to remove oscillations in the signals.

Step 204 estimates the EGR mass flow rate ($W_{21}$) and compressor mass flow rate ($W_{c1}$). The following describes one method of dynamically estimating $W_{c1}$.

To estimate $W_{c1}$, the EGR valve position ($\alpha_{egr}$) is determined, and the temperature across the EGR system ($T_{21}$) is determined from a steady-state map based on engine operating conditions. Alternatively, $T_{21}$ can be assumed to be a constant. The air charge temperature ($T_{c1}$) can also be measured by a temperature sensor such as sensor 58 of FIG. 1, or estimated based on engine operating conditions.

The EGR mass flow value is the calculated as a function of $p_1$, $p_2$, $T_{21}$, and $\alpha_{egr}$ according to the following equation:

$$W_{21} = f_1(\alpha_{egr}) p_2 / (RT_{21})^{1/2} \phi(p_1/p_2) \tag{1}$$

In equation (1), $f_1(\alpha_{egr})$ represents the effective flow area of the EGR valve as a function of the position of the EGR valve, R represents the difference between the pressure specific heat constant and volume specific heat constant, and φ represents a standard orifice equation having the following form:

$$\phi(r) = [(2\gamma/(\gamma-1))(r^{2/\gamma} - r^{(\gamma+1)/\gamma})]^{1/2}$$

for $r \geq (2/(\gamma+1))^{\gamma/(\gamma-1)}$ $$\phi(r) = \gamma^{1/2}(2/(\gamma+1))^{(\gamma+1)/(2(\gamma-1))}$$

for $r < (2/(\gamma+1))^{\gamma/(\gamma-1)}$

With knowledge of the EGR mass flow, $W_{21}$, the compressor flow rate $W_{c1}$ can be calculated from the following differential equation describing the intake manifold pressure:

$$dp_1/dt = (R\gamma/V_1)(W_{c1}T_{c1} + W_{21}T_{21} - W_{1e}T_1) \quad (2)$$

where the flow out of the intake manifold into the combustion chambers is given by:

$$W_{1e} = (NV_d n_{vol}/(RT_1 120))p_1 \quad (3)$$

wherein N represents the engine speed, $V_d$ represents the displacement volume of the engine, and $n_{vol}$ represents the volumetric efficiency of the engine. The volumetric efficiency is stored in the ECU memory as a function of one or more of the following variables: intake manifold pressure, intake manifold temperature, fuel rate, engine speed, and engine coolant temperature.

Hence, equation (2) can be rewritten as follows:

$$dp_1/dt = -Ap_1 + (R\gamma/V_1)(W_{c1}T_{c1} + W_{21}T_{21}) \quad (4)$$

where $$A = (NV_d \gamma n_{vol}/(V_1 120)) \quad (5)$$

Thus, from equation (5), the only unknown term is the compressor flow rate $W_{c1}$. An observer is, therefore, constructed to dynamically estimate the product $W_{c1}T_{c1}$ by interpreting the scaled enthalpy flow as the state of a dynamic system whose dynamics are assumed to be zero. In steady state, this is true; during transient conditions, however, the system dynamics can be approximated by a term proportional to the first derivative of the accelerator pedal position, requested fuel signal, or VGT actuator signal. Assume the state of the estimator is the scaled enthalpy flow, $z = W_{c1}T_{c1}$, and letting $\underline{p_1}$ and $\underline{z}$ be estimates of intake manifold pressure and z, respectively, a pressure error term and flow error term are defined as follows:

$$e_p = p_1 - \underline{p_1}$$

$$e_z = z - \underline{z}$$

The following differential equations are then observers for manifold pressure and enthalpy flow:

$$d\underline{p_1}/dt = -(A+MA)\underline{p_1} + MAp_1 + (R\gamma/V_1)(W_{21}T_{21} + \underline{z}) \quad (6)$$

$$d\underline{z}/dt = L(p_1 - \underline{p_1}) \quad (7)$$

where L and M are calibratable constants whose value is >0. The error dynamics for equations (6) and (7) are then:

$$de_p/dt = -(1+M)Ae_p + (R\gamma/V_1)(e_z) \quad (8)$$

$$de_z/dt = -Le_p \quad (9)$$

From the eigenvalues of this linear system, appropriate values for the design parameters M and L can be determined; a requirement being that the eigenvalues of the error system are in the left half of the complex plane. For example, assuming M=0.5, L=0.5, and $V_1$=0.003 m$^3$, and the engine operating conditions yielding $n_{vol}$=0.85, the eigenvalues are given by −7.3353 and −4.5647.

The estimate of the compressor airflow value ($W_{c1}$) is then given by the following equation:

$$W_{c1} = \underline{z}/T_{c1} \quad (10)$$

In order to implement equation (10) in the digital ECU, it can be discretized with a sufficiently small sampling period δt. In such a case, the value of $W_{c1}$ is governed by the following equations:

$$\underline{p_1}(k+1) = \underline{p_1}(k) + \delta t[-(A+MA)\underline{p_1}(k) + MAp_1(k) + (R\gamma/V_1) \ldots (W_{21}(k)T_{21}(k) + \underline{z}(k))] \quad (11)$$

$$\underline{z}(k+1) = \underline{z}(k) + \delta t[L(p_1(k) - \underline{p_1}(k))] \quad (12)$$

$$W_{c1}(k) = \underline{z}(k)/T_{c1}(k) \quad (13)$$

The compressor airflow value could also be defined on the basis of the ideal gas law—instead of the first law of thermodynamics as in equations (4) and (13).

Given estimates of $W_{21}$ and $W_{c1}$, the EGR flow fraction is calculated in Step 206 according to the following equation:

$$r = W_{21}/(W_{21} + W_{c1}) \quad (14)$$

In step 208, the desired set points for $p_1$ ($p_{1d}$) and r ($r_d$) are determined as a function of engine speed and the requested fueling rate. The set points, $p_{1d}$ and $r_d$, are generated from engine mapping data on a dynamometer. One method of generating the set points is to develop a uniform grid for engine speed and fueling rate. For each grid point, optimal settings for the EGR valve position and VGT actuator position are determined from emissions and fuel economy requirements for the selected operating point. The steady-state value of $p_1$ is then measured by the MAP sensor and recorded. The value of r is not measured directly, but can be calculated from the $CO_2$ concentrations in the intake and exhaust manifold with reference to $W_{c1}$. The values of $p_1$ and r are then stored in ECU memory in appropriate lookup tables indexed by engine speed and fueling rate. During transient engine operation, fuel limiting may cause the fuel that is injected into the combustion chambers to be different from the fueling rate requested by the driver. In such a case, the set points are preferably calculated on the requested, rather than the limited, fuel.

In step 210, error terms are generated representing the difference between the measured or estimated values and the desired set points:

$$e_r = r - r_d \quad (15)$$

$$e_{p1} = p_1 - p_{1d} \quad (16)$$

Step 212 determines the feed-forward values for the EGR and VGT duty cycles ($V_{egr}$ and $V_{vgt}$) as a function of the engine speed and actual fueling rate, $W_f$. These values are generated from open loop lookup tables stored in ECU memory.

In step 214, the proportional and integral gains are determined as a function of engine speed and $W_f$. Assuming the engine steady state gain from (EGR,VGT) duty cycles to (MAP,r) is $K_{dc}(N,W_f)$, and $K_g = K_{dc}^{-1}$, the proportional gain is defined as:

$$K_p(N, W_f) = \begin{pmatrix} 0 & k_{p12} K_{g12}(N, W_f) \\ k_{p21} K_{g21}(N, W_f) & 0 \end{pmatrix} \quad (17)$$

and the integral gain is defined as:

$$K_i(N, W_f) = \begin{pmatrix} 0 & k_{i12} K_{g12}(N, W_f) \\ k_{i21} K_{g21}(N, W_f) & 0 \end{pmatrix} \quad (18)$$

where $K_{gij}$ represents the (i,j)-th element of the matrix $K_g$ generated from steady-state engine mapping data. The gains, $k_{p12}, k_{p21}, k_{i12},$ and $k_{i21}$ are the same for all operating points, and are tuned on the engine so that given:

$K_{p,egr} = k_{p12} K_{g12}(N,W_f)$ $K_{I,egr} = k_{i12} K_{g12}(N,W_f)$ $K_{p,vgt} = k_{p21} K_{g21}(N,W_f)$ $K_{I,vgt} = k_{i21} K_{g21}(N,W_f)$ the control system exhibits the desired response properties. Accordingly, only four gains have to be tuned on the engine.

In step 216, the gains are used to generate duty cycle commands for the EGR and VGT along with the feed-forward values according to the following equations:

$$U_{egr} = V_{egr} + K_{p,egr} e_r + K_{I,egr} Z_r \quad (19)$$

$$U_{vgt} = V_{vgt} + K_{p,vgt} e_{p1} + K_{I,vgt} Z_{p1} \quad (20)$$

wherein $Z_r$ is the integrated value of $e_r$ and $Z_{p1}$ to the integrated value of $e_{p1}$. The integral action will drive the steady state value to the desired setpoint.

In step 218, the integrator states are updated, and one cycle of the engine control logic is completed.

Figure 3:
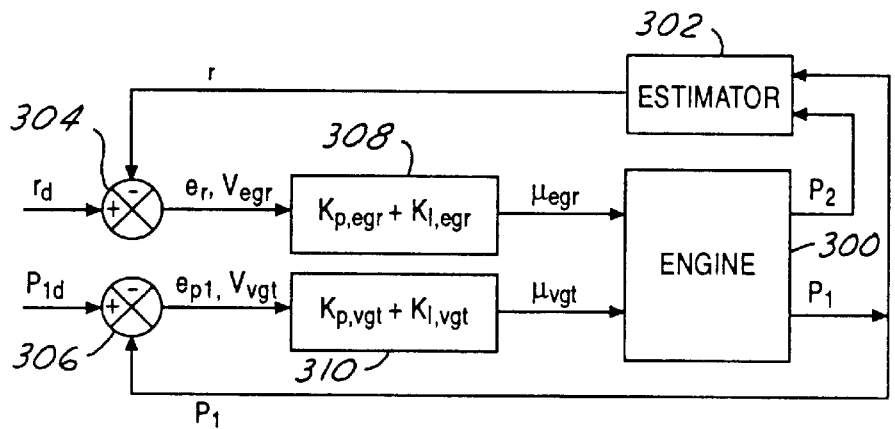
FIG. 3 is a block diagram of an engine control strategy according one embodiment of the present invention.

FIG. 3 is a block diagram of an engine control strategy according to the present invention. As shown in FIG. 3, the engine system 300 provides output signals of the intake manifold pressure ($p_1$) and exhaust manifold pressure ($p_2$). From these signals the estimator 302 calculates values for $W_{21}$ and $W_{c1}$ from which the EGR flow fraction (r) is determined according to equation (14). At nodes 304 and 306, error terms are generated for the EGR flow fraction and intake manifold pressure, respectively. These error terms and the open loop lookup table values for the EGR and VGT positions ($V_{egr}, V_{vgt}$) are combined with the proportional and integral feedback gains at 308 and 310, to generate the EGR duty cycle ($U_{egr}$) and VGT duty cycle ($U_{vgt}$), respectively.

While the invention has been described in connection with one or more embodiments, it will be understood that the invention is not limited to those embodiments. For example, rather than estimating $W_{c1}$, a MAF sensor could measure the compressor mass airflow. Although system costs would not be reduced relative to a conventional sensor set, the controller would still provide performance benefits. Specifically, errors in estimating or measuring $W_{c1}$ can lead to errors in the values of the burnt gas fraction ($F_1$) and air-to-fuel ratio (AFR) which can significantly impact smoke and NOx emissions. The sensitivity of $F_1$ and AFR to $W_{c1}$ estimation or measurement errors resulting from selecting r as a tracking output, however, is much less than if $W_{c1}$ is used as the tracking output. Accordingly, the invention covers all such alternatives, modifications, and equivalents, as may be included within the spirit and scope of the appended claims.

What is claimed is:

1. A method of controlling the airflow into a compression ignition engine having an exhaust gas recirculation (EGR) passage including a EGR valve connecting an intake manifold and exhaust manifold of the engine, said EGR valve responsive to an EGR valve control signal for regulating the flow of exhaust gas into said intake manifold, and a variable geometry turbocharger (VGT) including a compressor connected to a turbine, the compressor in communication with the intake manifold and the turbine in communication with the exhaust manifold, said turbine responsive to a turbocharger signal for regulating the intake manifold pressure, the method comprising the steps of:

determining a desired intake manifold pressure ($p_{1d}$) and desired EGR flow fraction ($r_d$);

detecting the intake manifold pressure ($p_1$);

generating a first deviation ($e_{p1}$) between the desired and detected intake manifold pressure;

detecting the exhaust manifold pressure ($p_2$), estimating the EGR flow fraction (r);

generating a second deviation ($e_r$) between the desired and estimated EGR flow fraction;

determining an open loop EGR valve control value ($V_{egr}$) and an open loop turbocharger value ($V_{vgt}$) as a function of the current engine speed and fueling rate;

generating proportional and integral feedback gains for the EGR valve ($K_{p,egr}, K_{i,egr}$) and turbocharger turbine ($K_{p,vgt}, K_{i,vgt}$);

generating said EGR valve control signal ($U_{egr}$) as a function of $V_{egr}, K_{p,egr}, K_{i,egr}$ and $e_r$;

generating said turbocharger signal ($U_{vgt}$) as a function of $V_{vgt}, K_{p,vgt}, K_{i,vgt}$ and $e_{p1}$;

controlling the EGR valve in accordance with $U_{egr}$ to regulate r; and controlling the turbocharger turbine in accordance with $U_{vgt}$ to regulate $p_1$.

2. The method as set forth in claim 1 wherein the step of determining a desired intake manifold pressure ($p_{1d}$) and desired EGR flow fraction ($r_d$) includes the step of retrieving $p_{1d}$ and $r_d$ from a table of values indexed by the requested fueling rate ($W_{f,req}$) and current engine speed (N).

3. The method as set forth in claim 1 wherein the step of estimating the EGR flow fraction (r) further comprises the steps of estimating the EGR mass flow rate ($W_{21}$) and compressor mass flow rate ($W_{c1}$) based on $p_1$ and $p_2$, and calculating the EGR flow fraction according to the following equation:

$r = W_{21}/(W_{21} + W_{c1})$

4. The method as set forth in claim 1 wherein the step of estimating the EGR flow fraction (r) further comprises the steps of measuring the compressor flow rate ($W_{c1}$), estimating the EGR mass flow rate ($W_{21}$) as a function of $p_1$ and $p_2$, and calculating the EGR flow fraction according to the following equation:

$r = W_{21}/(W_{21} + W_{c1})$

5. The method as set forth in claim 1 wherein the step of generating proportional and integral feedback gains for the EGR valve ($K_{p,egr}, K_{i,egr}$) and turbocharger turbine ($K_{p,vgt}, K_{i,vgt}$) includes the step of retrieving $K_{p,egr}, K_{i,egr}, K_{p,vgt}$ and $K_{i,vgt}$ from a table of values indexed by the current fueling rate ($W_f$) and engine speed (N).

6. The method as set forth in claim 1 wherein the steps of generating said EGR valve control signal ($U_{egr}$) and said turbocharger signal ($U_{vgt}$) includes the step of calculating $U_{egr}$ according to the following equation:

$$U_{egr}=V_{egr}+K_{p,egr}e_r+K_{i,egr}Z_r$$

wherein $Z_r$ represents the accumulated error and calculating $U_{vgt}$ according to the following equation:

$$U_{vgt}=V_{vgt}+K_{p,vgt}e_{p1}+K_{i,vgt}Z_{p1}$$

wherein $Z_{p1}$ represents the integrator state.

7. A compression ignition engine system comprising:
   an exhaust gas recirculation (EGR) passage including a EGR valve connecting an intake manifold and exhaust manifold of the engine, said EGR valve responsive to an EGR valve control signal for regulating the fraction of exhaust gas flowing into said intake manifold;
   a variable geometry turbocharger (VGT) including a compressor connected to a turbine, the compressor in communication with the intake manifold and the turbine in communication with the exhaust manifold, said turbine responsive to a turbocharger signal for regulating the intake manifold pressure;
   an exhaust manifold pressure sensor located in said exhaust manifold for providing an exhaust manifold pressure signal;
   an intake manifold pressure sensor located in said intake manifold for providing an intake manifold pressure signal;
   an engine control unit including memory and a microprocessor, said engine control adapted to receive as inputs said intake and exhaust manifold pressure signals and transmit as outputs the EGR valve control signal for regulating the EGR flow fraction and the turbocharger signal for regulating the intake manifold pressure.

8. In a compression ignition engine system having an exhaust gas recirculation (EGR) passage including an EGR valve connecting an intake manifold and exhaust manifold of the engine, said EGR valve responsive to an EGR valve control signal for regulating the flow of exhaust gas into said intake manifold, and a variable geometry turbocharger (VGT) including a compressor connected to a turbine, the compressor in communication with the intake manifold and the turbine in communication with the exhaust manifold, said turbine responsive to a turbocharger signal for regulating the intake manifold pressure, an engine control unit for regulating the airflow into said engine, said engine control unit comprising:
   memory for storing feedback gains and desired engine operating values; and
   a microprocessor for generating said EGR valve control signal and said turbocharger signal, said microprocessor programmed to:
   retrieve from said memory a desired intake manifold pressure value ($p_{1d}$) and a desired EGR flow fraction value($r_d$);
   receive a first pressure signal ($p_1$) indicative of the actual intake manifold pressure;
   generate a first deviation value ($e_{p1}$) between the desired and actual intake manifold pressure;
   receive a second pressure signal ($p_2$) indicative of the actual exhaust manifold pressure;
   estimate the EGR flow fraction (r) based on $p_1$ and $p_2$;
   generate a second deviation value ($e_r$) between the desired and estimated EGR flow fraction;
   retrieve from said memory an open loop EGR valve value ($V_{egr}$) and an open loop turbocharger value ($V_{vgt}$) from a table of values indexed as a function of engine speed and fueling rate;
   calculate proportional and integral feedback gains for the EGR valve ($K_{p,egr}/K_{i,egr}$) and turbocharger turbine ($K_{p,vgt}$, $K_{i,vgt}$);
   generate said EGR valve control signal ($U_{egr}$) as a function of $V_{egr}$, $K_{p,egr}$, $K_{i,egr}$ and $e_r$;
   generate said turbocharger signal ($U_{vgt}$) as a function of $V_{vgt}$, $K_{p,vgt}$, $K_{i,vgt}$ and $e_{p1}$;
   transmit $U_{egr}$ to said EGR valve to regulate r; and
   transmit $U_{vgt}$ to said turbocharger turbine to regulate $p_1$.

9. The engine control unit of claim 8 wherein said microprocessor is programmed to generate said EGR valve control signal ($U_{egr}$) and said turbocharger signal ($U_{vgt}$) according to the following equations:

$$U_{egr}=V_{egr}+K_{p,egr}e_r+K_{i,egr}Z_r$$

$$U_{vgt}=V_{vgt}+K_{p,vgt}e_{p1}+K_{i,vgt}Z_{p1}$$

wherein $Z_r$ represents the integrator state of r, and $Z_{p1}$ represents the integrator state of $p_1$.

* * * * *